July 7, 1964

R. C. FISCHER 3,139,717

FORAGE HARVESTER

Filed April 10, 1962

INVENTOR
Raymond C. Fischer
Paul O. Pippel
ATTORNEY

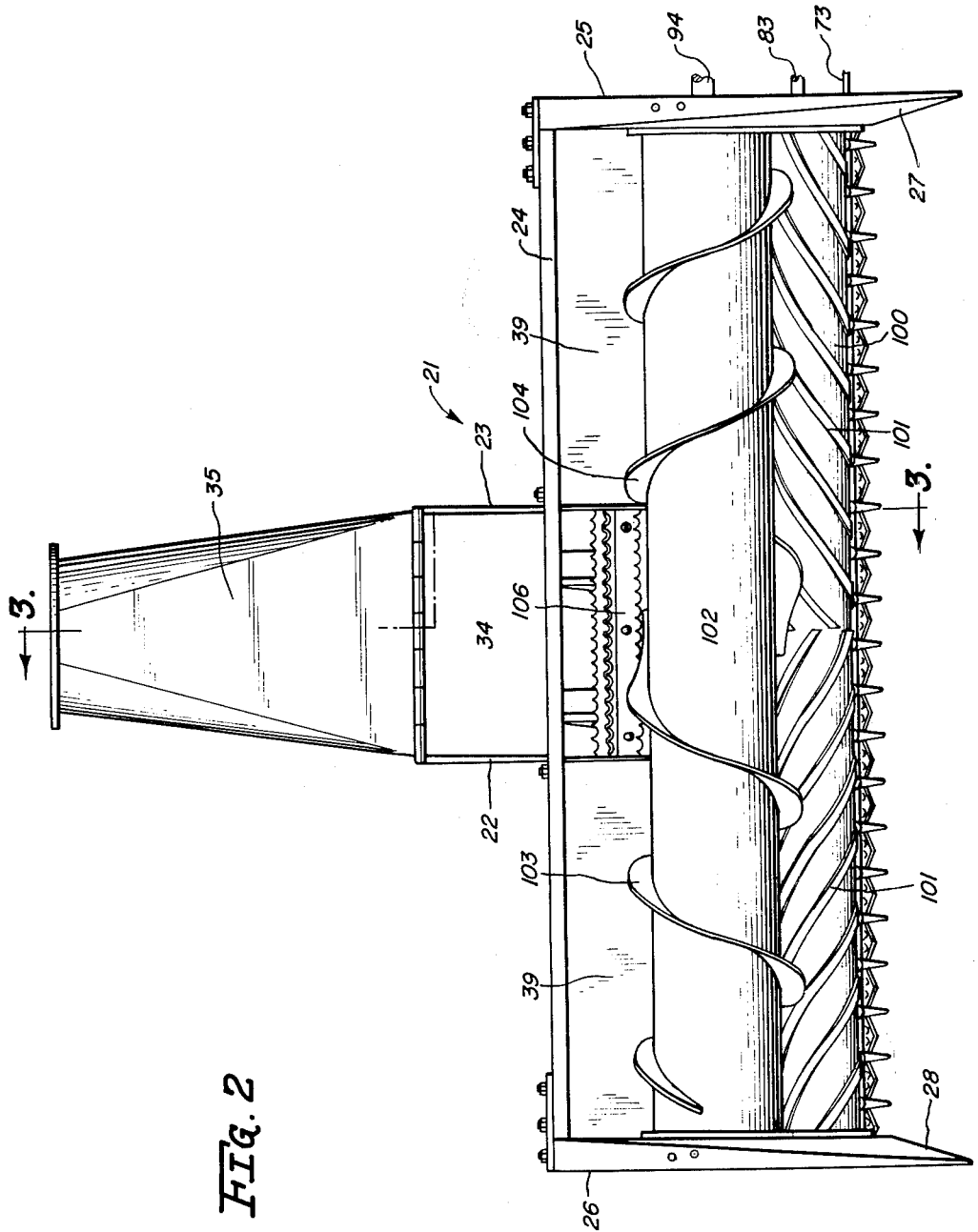

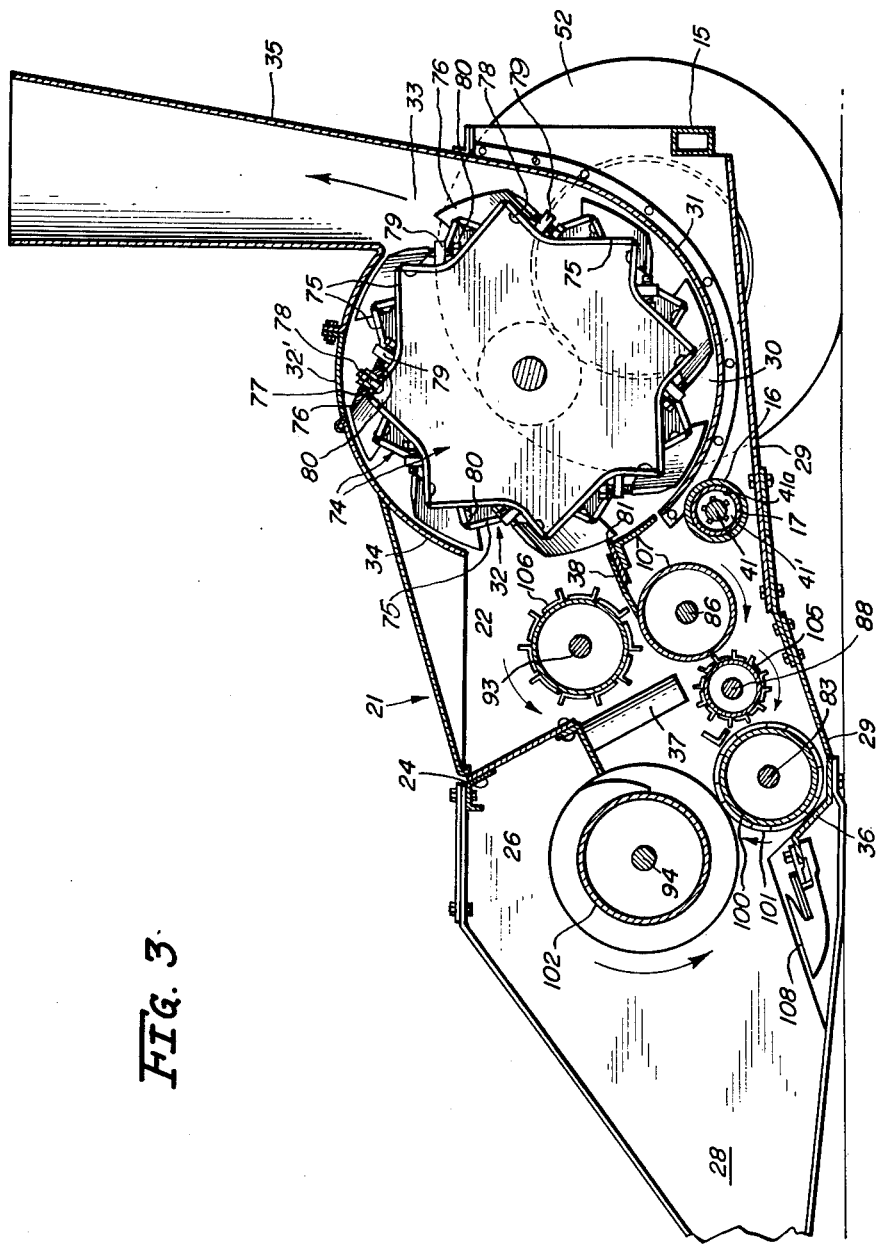

United States Patent Office 3,139,717
Patented July 7, 1964

3,139,717
FORAGE HARVESTER
Raymond C. Fischer, Hinsdale, Ill., assignor to International Harvester Company, Chicago, Ill., a corporation of New Jersey
Filed Apr. 10, 1962, Ser. No. 186,503
16 Claims. (Cl. 56—23)

The present invention relates generally to improvements in forage harvesters and the like, and more particularly to new and improved harvesters that are compact and have universal application.

In the field of harvesters, it has been the general practice to provide a basic harvesting unit that is adapted to receive any one of several attachments for feeding row crops, windrow forage, or standing forage crops to the basic unit. Although this arrangement has served the purpose, the attachments are large and cumbersome and a separate attachment is required for each operation.

The general purpose of this invention is to provide a harvester which embraces all the advantages of similarly employed harvesters and possesses none of the aforedescribed disadvantages. To attain this, the present invention contemplates a unique pickup roller cooperating with an upper auger to form a universal material-handling harvester unit. This new basic unit eliminates the need for conventional spring steel pickup teeth when gathering a windrow crop and the conventional reel when gathering standing forage crops. If the basic unit is being used to harvest windrow crops and it is desired to convert it to a unit for harvesting standing forage, the conversion is made by merely adding the sickle assembly. The basic unit with no adaptations whatsoever can be used to harvest row crops, such as corn or sorghum. However, it has been found that a lightweight inexpensive attachment having no moving parts can greatly increase the efficiency of the basic unit when being used to harvest standing row crops. The unique arrangement of the pickup roller and upper roller has also been found to be effective in other harvesting machines, such as combines and threshers.

An object of the present invention is the provision of a new crop pickup means for farm implements.

Another object is to provide a harvesting machine that can be used for standing row crops, standing forage crops and for windrow pickup.

A further object of this invention is the provision of a forage harvester in which the reel has been eliminated.

Still another object is to provide a windrow harvester in which the spring pickup teeth have been eliminated.

Still another object is to provide a forage harvester that is compact and eliminates the need for special attachments or very minor attachments for various applications of the machine.

These and other objects of the invention will become more apparent from the specification and drawings, wherein:

FIGURE 2 is an enlarged front elevation view of the harvester unit with the wheels and draft frame broken away; and FIGURE 3 shows a side elevation view taken along lines 3—3 of FIGURE 2.

Figure 1:
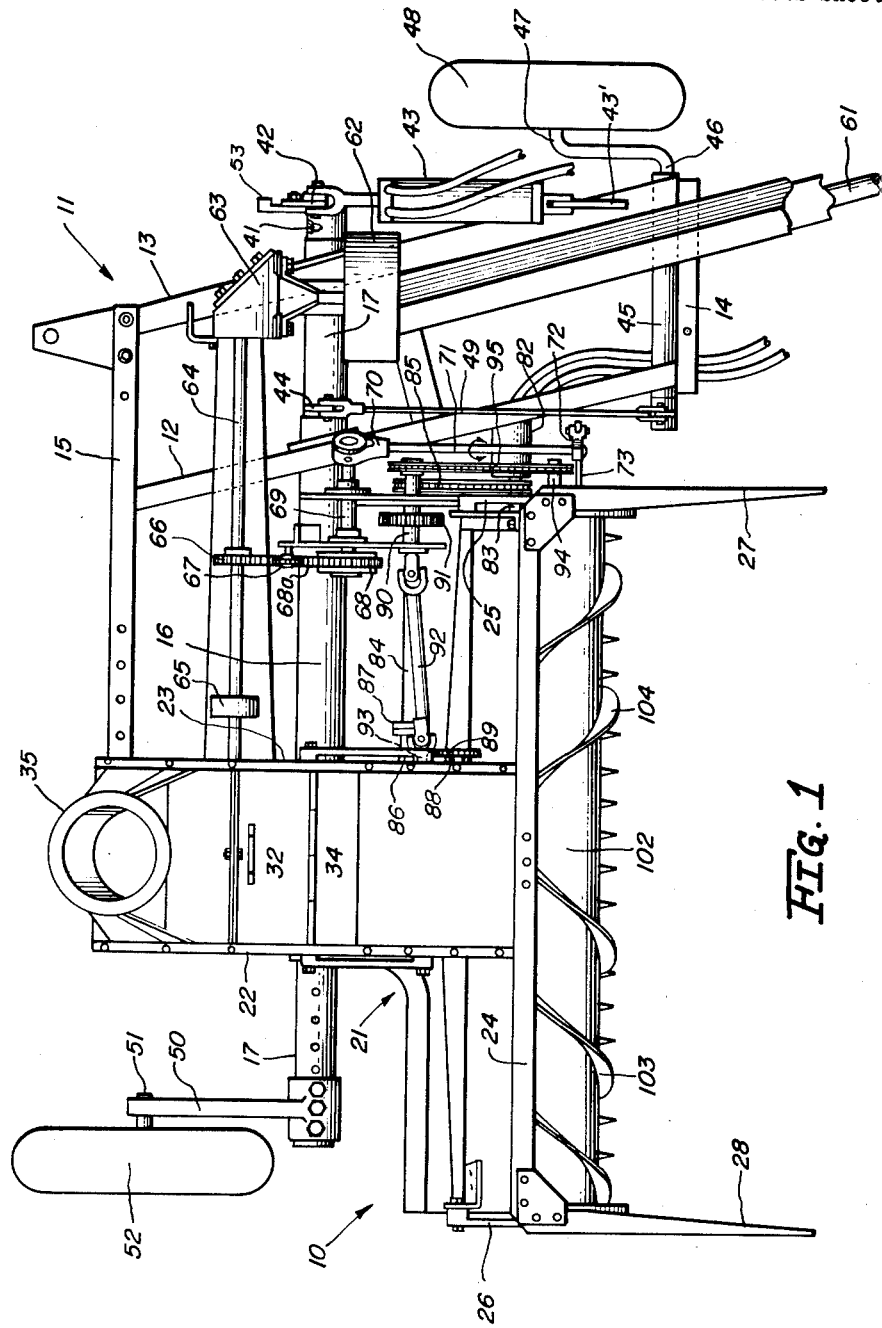
FIGURE 1 shows a plan elevation view of the harvester unit.

Referring now to the drawings, wherein like reference characters designate like or corresponding parts throughout the several views, there is shown in FIGURE 1 the harvester unit generally designated 10. The chassis of the harvester unit comprises two main parts, the base portion 11 and the body portion 21. As seen in FIGURE 1, the base portion comprises a pair of longitudinal frame members 12 and 13, a short transverse frame member 14, a long transverse frame member 15, and a torsion bar housing made up of an outer tube 16 and an inner tube 17. The body portion of the chassis is supported on the base portion and includes reinforced inner sides 22 and 23 having a forward frame member 24 secured to their forward upper edges. The outer extremities of said forward frame member 24 having reinforced outer sides 25 and 26 secured thereto which extend forwardly to form dividers 27 and 28. A cylinder or chamber 30 is formed between the reinforced inner sides by arcuate elements 31 and 32' as seen in FIGURE 3. This cylinder has a forward opening 32, a rear opening 33, and an access door 34 to obtain admittance to the chamber 30. Secured to said cylinder about said rear opening is a nozzle 35 through which the chopped material is adapted to be impelled. A bottom wall, generally designated 29, is connected to the reinforced inner sides of the body portion. Secured to the lower edge of the reinforced outer sides are sickle-mounting means 36. A converging housing or throat 37 is developed between the reinforced sidewalls 22, 23 forming an aperture midway between said outer sides or end walls 26, 27 in the rear wall 39 of the platform 20. An inclined feeding surface and smooth roll stripper 38 is mounted between the sides 22, 23 of the body or throat portion forwardly of the cylinder.

Referring now to FIGURES 1 and 3, for a description of the wheel suspension mechanism of the harvester unit. A torsion bar 41 is encased in the outer and inner tubes 16 and 17 and the left end (as viewed in FIGURE 1) of said bar 41 is splined to a hub 41' welded at 41a inside said tube 17. An upright arm 42 extends from the right-hand end of said torsion bar, as seen in FIGURE 1. Pivotally connected to the free extremity of arm 42 is the piston of the double-acting hydraulic cylinder 43 which is mounted to arm 43' on frame 14. A lug 53 extends from tube 17 in the path of upright arm 42, and upon actuation of cylinder 43 inner tube 17 is rotated. A second upright arm 44 is secured to inner tube 17. Secured to the base portion of the chassis is an axle housing 45 which journals the axle 46 that has an offset portion 47 upon which is mounted wheel 48. A linkage 49 connects arm 44 with axle 46, thus providing an operative connection between the double-acting hydraulic cylinder 43 and the wheel 48, such that the wheel is raised or lowered in response to movement of the cylinder piston. Secured to the left-hand end of inner tube 17, as seen in FIGURE 1, is an arm 50 having an axle 51 carrying wheel 52 mounted on its extremity. Thus it is seen that as the piston of the cylinder 43 moves towards the rear of the harvester unit, both wheels 48 and 52 will be moved downwardly and the harvesting unit will be elevated with respect to the ground, conversely as the piston of the cylinder 43 is moved towards the front of the harvesting unit the wheels will be moved up and the harvesting unit will be lowered with respect to the ground.

The cutter and sickle drive means will now be described with reference to FIGURE 1. The conventional power take-off 61 having a friction slip clutch 62 extends into the right angle gearbox 63 mounted on the base portion 11 of the chassis. Extending from the right angle gearbox through the center of the cylinder formed in the body portion of the chassis is the cutter drive shaft 64 which includes an overrunning clutch 65. Secured to said cutter drive shaft between the right angle gearbox and the friction slip clutch is a first sprocket 66. Journaled in a pair of plates mounted on the base portion of the chassis is a wobble shaft 69 having a second sprocket 68 secured thereto, and also mounted on one of these plates is a tightener sprocket 67. Sprocket 66 is thus connected to sprocket 68 by a continuous chain 68a, the tension of which can be adjusted by tightener sprocket 67 and rotary motion is thus supplied to wobble shaft 69. Secured to the other end of wobble shaft 69 is a wobble yoke 70 connected to a sickle drive shaft 71 having a sickle arm 72 secured thereto which is pivoted to the sickle bar 73. This is a conventional wobble drive for a sickle mower of the type disclosed in the patent to Paradise et al., No. 2,297,317.

Referring now to FIGURE 3, the cutter or chopper shall be described. The cutter is made up of a pair of axially spaced plates 74 shown in side elevation in FIGURE 3, said plates having stamped flanges 75 about their periphery. Brackets 79 are secured to the plates 74, said brackets having threaded apertures therethrough to receive bolts 80. The blades 76 have slots 77 formed therein, said slots being adapted to receive bolts 78 which secure the blades to the stamped flanges of the cutterheads. Bolts 80 are adjusted to properly position the blades 76 and bolts 78 are then used to clamp the blades against flanges 75. A stationary shear blade 81, as seen in FIGURE 3, is mounted on the body portion of the chassis and cooperates with the movable blade 76 to shear the material as it is fed into the cylinder.

The drive means for the pickup roller, the auger, the lower roll, the smooth roll and the upper roll will now be described with reference to FIGURE 1. In the embodiment illustrated, a hydraulic motor 82 operative from the hydraulic system of the tractor has been utilized. However, a mechanical drive system powered by the conventional power take-off of the tractor could, of course, be utilized. In the embodiment illustrated the hydraulic motor 82 is connected to and directly drives the pickup roller shaft 83, which shaft has a sprocket mounted thereon over which a chain 85 rides to transmit rotary movement to the lower shaft 84. The lower shaft 84 is connected to the smooth roller shaft 86 by a coupling 87 and the rotary motion thus transmitted to the smooth roller shaft 86 is transferred to the lower roll shaft 88 by a chain 89. An upper shaft 90 is journaled immediately above the lower shaft 84, and the two shafts are interconnected by a pair of gears, gear 91 of which is mounted on upper shaft 90. A universal drive 92 connects the upper shaft 90 to the upper roll shaft 93. A chain 95 connects the other end of upper shaft 90 to the auger shaft 94.

A conventional sickle 108 is mounted on the sickle mounting means 36 extending from reinforced outer side 25 to the opposite outer side 26, thus spanning the complete width of the body portion of the chassis. Immediately behind the sickle 108 and coextensive therewith is mounted the pickup roller 100 having left and right-hand spiral straps 101 mounted thereon such that material will be fed towards the mid point of said pickup roller. It has been found that a tire carcass roll of the type used in hay conditioners can be used in place of the pickup roller having the spiral straps. The pickup roller 100 is mounted on the pickup roller shaft 83 and is adapted to be driven in a clockwise direction as seen in FIGURE 3. An upper roll or auger 102 is mounted on the upper roll shaft 94 which shaft is located above and slightly forward of the pickup roller shaft 83. As can be seen, for example, in FIGURE 2, the upper roller has left-hand auger flightings 103 and right-hand auger flightings 104 which are adapted to feed the material towards the mid point of the auger or upper roller 102. The upper roller or auger 102 is located with respect to the pickup roller 100 such that the outer periphery of the auger flightings and spiral straps are adjacent to each other. The auger or upper roller 102 being mounted on upper roller shaft 94 is driven in a counterclockwise direction, as indicated by the arrow in FIGURE 3. The peripheral speed of said auger or upper roller being substantially equal to the peripheral speed of the pickup roller 100. The feed roll 105 is mounted on a lower feed roll shaft located behind and slightly above the pickup roller shaft 83, said lower feed roll extending between the reinforced inner sides 22 and 23. The lower feed roll 105 rotates in a clockwise direction as indicated by the arrow in FIGURE 3 at a peripheral speed slightly less than that of pickup roller 100 and auger 102. A smooth feed roller 107 mounted on smooth feed roller shaft 86 is located to the rear and slightly above the lower feed roll 105. This smooth feed roll is coextensive with the lower feed roll 105, rotating in the same direction as the lower feed roll but at a slightly reduced peripheral speed. An upper feed roll 106 is mounted on an upper feed roll shaft 93 and is located generally above the smooth feed roll such that material will be fed between the upper feed roll and the smooth feed roll. As is indicated by the arrow in FIGURE 3 the upper feed roll rotates in a counterclockwise direction.

The feed means described above and illustrated in the drawings is exemplarily shown as consisting of the lower feed roll 105, the smooth feed roll 107 and the upper feed roll 106. Of course, other feed means well known in the art such as flexible feed aprons or combinations of aprons and feed rolls could be used.

Operation

When using the harvester unit for standing forage crops, the unit, as shown for example in FIGURE 3, is used. The standing forage crop is sheared by the sickle 108, it leans forward against the uncut crop, and due to the forward motion of the machine and the rotation of the auger, the butt ends of the stems are fed between the auger 102 and the pickup roll 100. As the severed crop is being fed between the auger 102 and pickup roll 100, it is simultaneously being fed towards the center of said rolls as a result of the spiral straps and left and right-hand flightings on said rolls. This, in combination with the converging housing 37, results in the severed crops being fed to the center of the pickup roll and auger where they are then engaged by the lower feed roll 105 which directs the material towards the rear of the unit and between the smooth feed roll and the upper feed roll. The material emerges from between the smooth feed roll 107 and the upper feed roll 106 onto a feeding surface 38, beneath which is mounted the stationary shear blade 81. The material is then fed into the cylinder through the opening 32 and as the cutter rotates blades 76 cooperating with the stationary shear blade 81 to chop the severed crop. The blades 76 then operate as an impeller, carrying the chopped crop around the cylinder until the rear opening 33 in the cylinder is reached and the chopped crop is then impelled out the nozzle 35.

The sickle 108 may be removed from the unit and the pickup roll 100 then will function to pick up the crop, and throw the crop in a vertical direction, it is then fed between said pickup roll and the auger 102. The feeding means, cutter and impeller operate in the same manner as described above.

When harvesting row crops, such as corn or sorghum, the unit is used with the sickle 108 assembled. The severed base of the row crops are fed inwardly towards the mid point of the pickup roller and auger and then rearwardly over the feed means and into the cylinder where they are chopped by the cutting means and impelled through the spout 35.

Thus it is seen that a harvesting unit has been described that can be used for harvesting standing forage crops, windrow crops, and row crops without the need for large, cumbersome attachments. It should be understood, of course, that the foregoing disclsoure relates to only a preferred embodiment of the invention and that numerous modifications or alterations may be made therein without departing from the spirit and scope of the invention as set forth in the appended claims.

What is claimed is:

1. In a harvester comprising, a chassis, a mower on the chassis for cutting ground borne crops, a pickup roller rotatably mounted on said chassis adjacent the ground behind the mower in crop-receiving relation thereto, an upper roller rotatably mounted on said chassis above said pickup roller, the peripheries of said rollers being adjacent to each other and defining intake and discharge sides, a chamber structure mounted on said chassis and having a front opening in receiving relation to said discharge side of said rollers, rotary cutting means mounted in said chamber structure, said chamber structure having a material discharge opening, and drive means to rotate said rolls in a direction for grasping the material and moving it into said front opening of the chamber, said cutting means adapted to chop the material and exit it through said material discharge opening.

2. A harvester adapted to be moved over the crop material to be harvested, a support structure having a front edge, a mower on the support structure in advance of said front edge, a pickup roller mounted on said structure and extending along the front edge thereof, an upper roller mounted on said structure above said pickup roller, said rollers having peripheral edges disposed cooperatively adjacent to each other, said support structure having a crop outlet rearwardly of said rollers, and drive means for said rollers for rotating the same in a direction advancing the material from front to rear of said support structure, said rollers being immediately adjacent to the mower for grasping the crops from the mower as it is cut thereby for removing the crop material therefrom.

3. The invention as set forth in claim 2 wherein said upper roller has left and right-hand spiral flightings thereon adapted to feed the material midwardly of said roller.

4. The invention according to claim 2 wherein said lower roller is of smaller diameter than the upper roller and said upper roller comprises a spiral flight extending forwardly of said lower roller.

5. The invention according to claim 2 wherein said lower roller is of smaller diameter than the upper roller and said upper roller comprises a spiral flight extending forwardly of said lower roller and said upper and lower rollers having generally horizontal, substantially parallel axes of rotation, and the axis of rotation of the upper roller being in advance of the axis of rotation of the lower roller.

6. The invention according to claim 2 wherein said lower roller comprises spiral flights.

7. The invention according to claim 2 wherein said lower roller is of elastomer material.

8. The invention according to claim 2 wherein said lower roller is made of tire carcass material.

9. The invention according to claim 2 wherein said lower roller extends below the mower and said rollers develop a forwardly open bite adjacent to the plane of the mower.

10. The invention according to claim 2 wherein each roller comprises a flight and said upper roller extends forwardly of the lower roller over the discharge area of the mower.

11. The invention according to claim 2 wherein said upper and lower rollers are mounted for rotation from the support structure on generally parallel substantially horizontal axes, said upper roller being of larger diameter than the lower roller and projecting thereahead and said lower roller extending below the cutting plane of the mower, a housing having portions beneath and behind said lower roller, at least one of said rollers having spiral flights cooperating with said housing portions for advancing crop material therealong.

12. The invention according to claim 11 wherein one of said rollers is made of elastomer material.

13. The invention according to claim 2 wherein said upper and lower rollers are mounted for rotation from the support structure on generally parallel substantially horizontal axes, said upper roller being of larger diameter than the lower roller and projecting thereahead and said lower roller extending below the cutting plane of the mower, a housing having portions beneath and behind said lower roller, both of said rollers having spiral flights cooperating with said housing portions for advancing crop material therealong and said upper roller extending over the mower.

14. The invention according to claim 2 wherein said upper and lower rollers are mounted for rotation from the support structure on generally parallel substantially horizontal axes, said upper roller being of larger diameter than the lower roller and projecting thereahead and said lower roller extending below the cutting plane of the mower, a housing having portions beneath and behind said lower roller, at least one of said rollers having spiral flights cooperating with said housing portions for advancing crop material therealong, one of said rollers being made of elastomer material, and the other of said rollers having spiral flights and said upper roller extending over the mower, a chamber communicating with said crop outlet in receiving relation to the material from said rollers, and a conveying roller in the chamber directly behind said lower roller.

15. In a crop harvesting machine, having a platform elongated transverse to the direction of travel over a field and having a lower forward edge for operation close to the ground, a lower roller mounted on the harvester generally parallel to said edge in close proximity thereto and having a generally horizontal axis of rotation, an auger superposed with respect to said lower roller and rotatably mounted upon the harvester and having flights extending in close proximity with the periphery of said lower roller for grasping crops therewith and drawing the same from in front of the platform onto the platform, said platform having a crop discharge opening and said auger rotatable in a direction advancing the crops, through engagement with said flight generally parallel to the auger along said platform into said discharge opening, said platform having a wall portion behind said auger for confining the crops between itself and the auger as said auger advances said crops toward the discharge opening.

16. The invention according to claim 15 and said lower roller having auger flighting cooperative with said auger to assist in moving said crops lengthwise of the auger.

References Cited in the file of this patent

UNITED STATES PATENTS

| | | |
|---|---|---|
| 2,630,664 | Hansen | Mar. 10, 1953 |
| 2,829,481 | Jarvis | Apr. 8, 1958 |
| 3,023,560 | Krahn | Mar. 6, 1962 |
| 3,039,256 | Witt | June 19, 1962 |